United States Patent
Picard et al.

(10) Patent No.: US 8,684,400 B2
(45) Date of Patent: Apr. 1, 2014

(54) APPARATUS FOR PROTECTING THE KNEE REGION OF A VEHICLE OCCUPANT

(75) Inventors: Gregor Picard, München (DE); Thomas Reiter, Vierkirchen (DE); Ingo Berger, Baierback (DE)

(73) Assignee: Autoliv Development AB, Värgärda (SE)

( * ) Notice: Subject to any disclaimer, the term of this patent is extended or adjusted under 35 U.S.C. 154(b) by 0 days.

(21) Appl. No.: 13/502,844

(22) PCT Filed: Sep. 7, 2010

(86) PCT No.: PCT/EP2010/005473
§ 371 (c)(1), (2), (4) Date: Apr. 19, 2012

(87) PCT Pub. No.: WO2011/047750
PCT Pub. Date: Apr. 28, 2011

(65) Prior Publication Data
US 2012/0205898 A1   Aug. 16, 2012

(30) Foreign Application Priority Data
Oct. 22, 2009 (DE) .................... 10 2009 050 384

(51) Int. Cl.
*B60R 21/206* (2011.01)
*B60R 21/233* (2006.01)
*B60R 21/2342* (2011.01)
*B60R 21/201* (2011.01)

(52) U.S. Cl.
USPC ...... 280/730.1; 280/729; 280/742; 280/743.2

(58) Field of Classification Search
USPC ............... 280/730.1, 729, 742, 743.2, 743.1, 280/728.1
See application file for complete search history.

(56) References Cited

U.S. PATENT DOCUMENTS

| 5,458,366 A | 10/1995 | Hock |
| 7,837,229 B2 * | 11/2010 | Ishida et al. ............... 280/743.1 |
| 2009/0134611 A1 | 5/2009 | Wigger et al. |

FOREIGN PATENT DOCUMENTS

| DE | 298 07 424 U1 | 10/1998 |
| DE | 203 07 535 U1 | 8/2003 |

(Continued)

OTHER PUBLICATIONS

PCT International Search Report—Sep. 7, 2010.

(Continued)

*Primary Examiner* — Paul Dickson
*Assistant Examiner* — Keith Frisby
(74) *Attorney, Agent, or Firm* — Brinks Gilson & Lione

(57) ABSTRACT

A knee airbag (100) which is deployed between the vehicle occupants and a vehicle structure (2) and a gas generator (4) for filling the knee airbag (100) with inflating gas, wherein the knee airbag (100) has a base chamber (10) which is filled first with inflating gas, and at least one further upper chamber (20, 30) which receives the inflating gas conducted through the base chamber (10). A flow obstacle (12, 23) for the inflating gas is arranged between the base chamber (10) and the one or more upper chambers (20, 30). The one or more upper chambers (20, 30) is rolled up or collapsed and is secured in the rolled-up or collapsed state, the securing (21, 22) being designed in such a manner that it fails when a predetermined degree of filling of the base chamber (10) is reached.

12 Claims, 6 Drawing Sheets

(56) References Cited

FOREIGN PATENT DOCUMENTS

| DE | 20 2006 005 872 U1 | 7/2006 |
| DE | 603 05 374 T2 | 5/2007 |
| DE | 10 2006 013 287 A1 | 9/2007 |
| DE | 10 2006 051 218 A1 | 11/2007 |
| DE | 10 2006 040 177 A1 | 2/2008 |
| DE | 10 2005 037 845 A1 | 8/2008 |
| EP | 1 354 771 A1 | 10/2003 |
| EP | 1 508 485 A1 | 2/2005 |

OTHER PUBLICATIONS

German Search Report—Sep. 7, 2010.

* cited by examiner

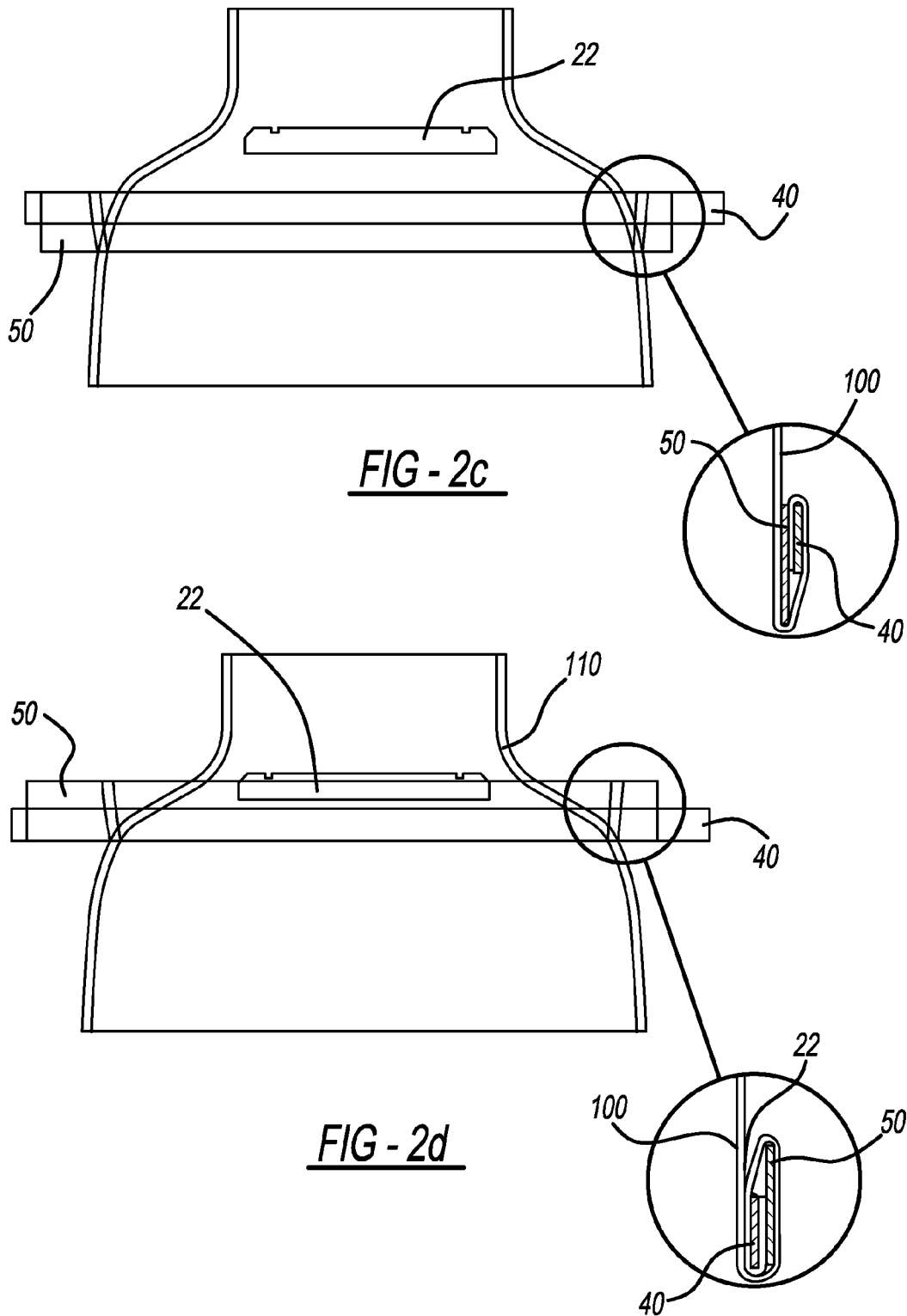

APPARATUS FOR PROTECTING THE KNEE REGION OF A VEHICLE OCCUPANT

CROSS-REFERENCE TO RELATED APPLICATIONS

This application claims priority to German Patent Application No. 10 2009 050 384.6, filed Oct. 22, 2009 and PCT/EP2010/005473, filed Sep. 7, 2010.

FIELD OF THE INVENTION

The invention relates to an impact protection device for motor vehicle occupants, with a knee airbag which is deployed between the vehicle occupants and a vehicle structure, and a gas generator for filling the knee airbag with inflating gas, wherein the knee airbag has a base chamber which is filled first with inflating gas, and at least one further upper chamber which receives the inflating gas conducted through the base chamber, and wherein a flow obstacle for the inflating gas is arranged between the base chamber and the upper chamber.

BACKGROUND OF THE INVENTION

A protection device of above mentioned general type is, in particular, preferably used for knee airbags which have a low-lying installation position such that, during inflation, the knee airbag has to be placed from below upwards in front of the vehicle structure. The deploying airbag therefore has to be positioned in front of the instrument panel or the glove compartment from the foot well.

DE 10 2006 040 177 A1 describes a subassembly with an instrument panel for motor vehicles and a knee airbag which, in the rest state, is accommodated in a housing. Upon activation, the knee airbag is inflated between a lower section of the instrument panel and the area of the knee and shin bone of the occupant to be protected. In order to make production of vehicle versions with and without a knee airbag easier, the housing is located on or in a shaped part adjoining the lower section of the instrument panel. Due to the large volume of the knee airbag, the internal pressure of the airbag is relatively low in a first deployment phase, which results in poor positioning of the knee airbag.

DE 298 07 424 U1 describes a knee protection device for vehicle occupants, with an airbag which, in the inflated state, extends in front of the vehicle occupant's knees in the restraint situation, bears against the knees in the restraint situation and is intended to substantially prevent the knees from shifting forwards. The knee protection device is intended to be distinguished by a high and specific restraining force in the region of the knees. This is achieved by means of catch straps (or tethers) which connect mutually opposite sections of the airbag wall. The catch straps are fastened to the airbag wall and are arranged in such a manner that they oppose a change in shape of the airbag when the knees plunge into the airbag. The catch straps serve as partitions and have at least one overflow opening. The overflow opening acts like a throttle, thus resulting in an overall more stable structure of the airbag and of the effect of an external force. The partition is not fastened at the sides to the airbag wall, thus producing overflow channels at the sides such that, when the airbag is deployed, the partitions negatively effect the inflating speed.

DE 10 2006 013 287 A1 describes an airbag for a motor vehicle, with a flow passage via which two pressure chambers are connected to each other, wherein a flow medium flows in a pass-through direction from one pressure chamber into another pressure chamber through the flow passage. The flow passage comprises a means for protecting against backflow which permits the flow medium to flow in the pass-through direction while the flow of flow medium in a blocking direction opposed to the pass-through direction is substantially prevented.

U.S. Pat. No. 5,458,366 describes a knee cushion device with an airbag which is divided into individual compartments. A gas generator conducts inflating gas into a collecting chamber via which the inflating gas is conducted into the individual compartments of the airbag. The collecting chamber is connected to the individual compartments via a one-way valve in each case. The collecting chamber is arranged behind the individual compartments in the direction of travel and does not contribute to supporting the knee cushion.

DE 20 2006 005 872 U1 relates to a knee protection device for vehicle occupants, with an airbag and a gas generator which is connected to the airbag via an inlet opening, wherein the airbag has at least two chambers which, in the installed, inflated state, are essentially located one above the other and are connected to each other via at least one overflow opening. The inlet opening of the gas generator is assigned to the upper chamber, and the overflow opening is designed in such a manner that the gas overflows from the upper chamber into the lower chamber until a uniform pressure is reached with a certain time delay in order to maintain a greater pressure in the knee chamber for a longer period of time.

DE 10 2006 051 218 A1 describes a vehicle occupant restraint device with an airbag module which has a housing and an airbag which has a free outlet end at which said airbag moves into the fully deployed position thereof. At least one control element is provided, the control element acting on the airbag and forcing the airbag in the deployed state into an overall curved profile from the housing as far as the free outlet end. The control element may be designed as a catch strap which acts on the rear and on a front envelope part of the airbag, wherein the fastening points of the catch strap are offset with respect to one another in the direction of deployment of the airbag. That end of the catch strap which is not assigned to the airbag is fixed on a vehicle structure or on the airbag housing.

DE 603 053 74 T2 describes an occupant leg protection device with a main chamber which is inflated first by gas which has been introduced by a gas generator. An auxiliary chamber which is inflated by the gas which is conducted through the main chamber is arranged along a surface of the main chamber in the vicinity of the occupant or along the surface of the main chamber away from the occupant. The main chamber has a plurality of chambers between which separating lengths of fabric are arranged. Intermediate spaces through which the gas can flow in the individual chambers are provided on the side borders of the separating lengths of fabric.

Since the knee airbags are generally fitted below an instrument panel and are therefore located relatively far away from the extremities to be protected, they require a relatively large volume. After the gas generator has triggered and an airbag covering opened, the collapsed airbag is ejected at high speed. During the subsequent, first deployment phase, the internal pressure of the airbag drops rapidly, since more airbag volume is provided than the gas generator can deliver. Said relatively low internal pressure results in mechanical instability of the airbag during the positioning in the first deployment phase.

It is therefore the object of the present invention to provide a protection device which takes the abovementioned problems into account and, despite an unfavourable mounting positioning in the rest state, ensures rapid and stable deployment of the airbag.

SUMMARY OF THE INVENTION

The protection device according to the present invention for vehicle occupants, has a knee airbag which is deployed between the vehicle occupants and a vehicle structure, and a gas generator for filling the knee airbag with inflating gas. The knee airbag has a base chamber which is filled first with inflating gas, and at least one further upper chamber which receives the inflating gas conducted through the base chamber, and wherein a flow obstacle for the inflating gas is arranged between the base chamber and the upper chamber, makes provision for the upper chamber to be rolled up or collapsed and to be secured in the rolled-up or collapsed state, the securing being designed in such a manner that it fails when a predetermined degree of filling of the base chamber is reached. The upper chamber or the upper chambers is or are rolled up or collapsed and is or are fixed in this form so that, during the initial filling of the airbag with inflating gas, the upper chamber or upper chambers do not provide too great a volume which cannot be filled sufficiently rapidly by the gas generator. The securing or fastening of the upper chamber fails when a certain degree of filling of the base chamber is reached, preferably when the base chamber is completely or virtually completely filled. The staggered filling of the individual chambers of the knee airbag make it possible to prevent an uncontrolled movement of the initially unfilled knee airbag elements, i.e. of the one or more upper chambers, in the direction of the occupant or in the direction of the first movement of the airbags after emerging from the casing. A misalignment of the one or more upper chambers can no longer occur, since the lower base chamber, i.e. the chamber which is closest to the gas generator, is filled first and only after the filling thereof, are the subsequent one or more upper chambers filled. With the protection device according to the invention, it is possible to realize a dynamic, curved filling of the airbag without the knee airbag having to be supported upon deployment against the shin bones or knees of a vehicle occupant. This is beneficial in particular to the vehicle occupants who are not in the designated standard position (i.e. an "out of position" occupant).

The securing or the fastening of the rolled-up upper chamber or upper chambers according to this invention can take place via one or more tear seams and/or a catch strap or more than one catch strap. The tear seams serve to position the folded or rolled-up airbag parts, i.e. the one or more upper chambers, wherein the fastening can take place in different ways. There is the possibility of fitting one tear seam directly on the airbag fabric such that parts of the upper chamber are sewn, adhesively bonded or fastened in some other way directly to the fabric or material of the base chamber. It is likewise possible for a tab or a catch strap to be arranged on the base chamber, the end of said tab or catch strap which is not assigned to the base chamber being fastened to the upper chamber and holding the collapsed or rolled-up chamber in the respectively desired state. After the complete or virtually complete filling of the base chamber, the fastening point on the base chamber and/or the one or more upper chambers can then fail, or, as an alternative thereto, the catch strap can fail. The catch strap can be produced from a very wide variety of materials, for example from a fabric, a film or a strip of material. The fastening to the airbag material can take place by means of sewing, adhesive bonding, welding or in another manner.

The securing, i.e. the catch strap, the tear seam or a different type of securing, will advantageously fail only when the base chamber is completely filled, and therefore a stable base is provided by the completely inflated base chamber such that the lower region of the knee airbag, which region is assigned to the gas generator, ensures reliable positioning of the chambers filled subsequently. By means of the reliable positioning of the upper airbag regions, i.e. of the upper chambers adjoining the base chamber, reliable deployment along the vehicle structure can be ensured.

The upper chamber is preferably rolled up or collapsed away from the vehicle occupant from the end remote from the gas generator. This means that the knee airbag is rolled up in such a manner that the airbag material is rolled up in the direction of the vehicle structure. Upon deployment, this means that, during the filling of the chambers, a force component acts in the direction of the vehicle structure, since the base chamber and the upper chambers are filled in a wedge-shaped manner, and therefore that region of the chambers which is not yet filled is pressed against the vehicle structure. This assists the desired direction of deployment which is intended to extend along the vehicle structure as close as possible thereto such that optimum deployment can be achieved even without bearing against the lower extremities of the vehicle occupant.

A plurality of rolled-up or collapsed upper chambers can be provided, between which a flow obstacle is in each case arranged. Each upper chamber is secured in the rolled-up or collapsed state, the respective securing being designed in such a manner that it fails when a predetermined degree of filling of the previous upper chamber is reached. This results in a sequential deployment of the individual upper chambers. The subsequent upper chamber can be fastened, for example, to the previous upper chamber by means of a tear seam, a tab, a catch strap or the like. A spot-type adhesive bond or the like may likewise be provided in order to fix the upper chamber in the rolled-up state. It is also possible for the respective upper chamber to be fixed per se without a connection to the previous chamber, and therefore only the rolled-up upper chamber is kept more or less completely collapsed as far as the flow obstacle, and therefore no inflating gas or only a small amount of inflating gas can enter the collapsed or rolled-up upper chamber.

The flow obstacle or the flow obstacles can be designed as a tear seam, catch strap or throughflow opening which is enlarged as the gas pressure increases. The tear seam results in a virtually complete separation of the individual chambers, for example of the base chamber and the upper chamber or the upper chambers, from one another. It is likewise possible to provide a catch strap which provides additional mechanical stabilization of the knee airbag in the folded state. Slots or the like can be arranged in the catch strap in order to enable the inflating gas to flow through. Lateral throughflow openings can likewise be provided at the ends of the catch straps. It is furthermore possible for there to be one throughflow opening or more than one throughflow opening, said throughflow openings being opened and enlarged only at a certain internal pressure, in order then to permit gas to pass through. It is also possible for membranes to be provided which fail at a certain internal pressure of the chamber such that the subsequent chamber is filled only after the previous chamber in the direction of flow of the inflating gas is virtually completely filled.

The knee airbag has a curved shape in the filled state, the curvature of that side of the knee airbag which faces away from the vehicle occupant corresponding to the curvature of the vehicle structure.

The securing of the rolled-up regions of the knee airbag, i.e. of the upper chambers, can take place on the lateral edges of the knee airbag, thus enabling the invention to be easily realized without fundamental changes to the operating processes. In this case, the edges of the collapsed upper chambers are fixed, for example adhesively bonded, welded or sewn, to the edges either directly next to the flow obstacle or to the chamber mounted in front in the direction of travel.

A development of the invention makes provision for folds resting on one another in the upper chamber to be fixed on one another via a tear seam or on an additional tab of the knee airbag such that the folds in the upper chamber are fixed on themselves. As an alternative, the fixing is undertaken via a tab which is arranged on the knee airbag, either in the region of the upper chamber or of the chamber mounted in front in each case, for example the base chamber. A region of the upper chamber, which region is at a distance from the respective flow obstacle, i.e. a region of the upper chamber which is mounted downstream of the flow obstacle in the direction of flow, is fixed mechanically on the base chamber such that the upper chamber is coupled to the degree of deployment of the base chamber via a mechanical fixing of the upper chamber to the base chamber. The fixing can take place in different ways, for example by adhesive bonding, sewing, welding or a form-fitting connection. The fixing or fastening fails at a predetermined degree of filling of the base chamber.

The knee airbag can be collapsed from the end remote from the gas generator in the direction of the gas generator with different folding widths, thus resulting in individual upper chamber layers which are positioned one above another and can be easily fastened to an edge region of the knee airbag or to a tab or a catch strap. In this case, it is provided that the folding width at the end remote from the generator is narrower than that end of the fold which faces the generator, and therefore, at the final fold, there is only a double layer of material or fabric, which layer faces that region of the knee airbag, for example the base chamber, which is mounted upstream in the direction of flow. As a result, only a double layer has to be sewn via a tear seam, which simplifies the production process.

BRIEF DESCRIPTION OF THE DRAWINGS

An exemplary embodiment of the invention is explained in more detail below with reference to the attached figures, in which:

FIGS. 2a to 2e show an exemplary embodiment of an airbag fold and airbag fixing.

DETAILED DESCRIPTION OF THE INVENTION

Figure 1A:
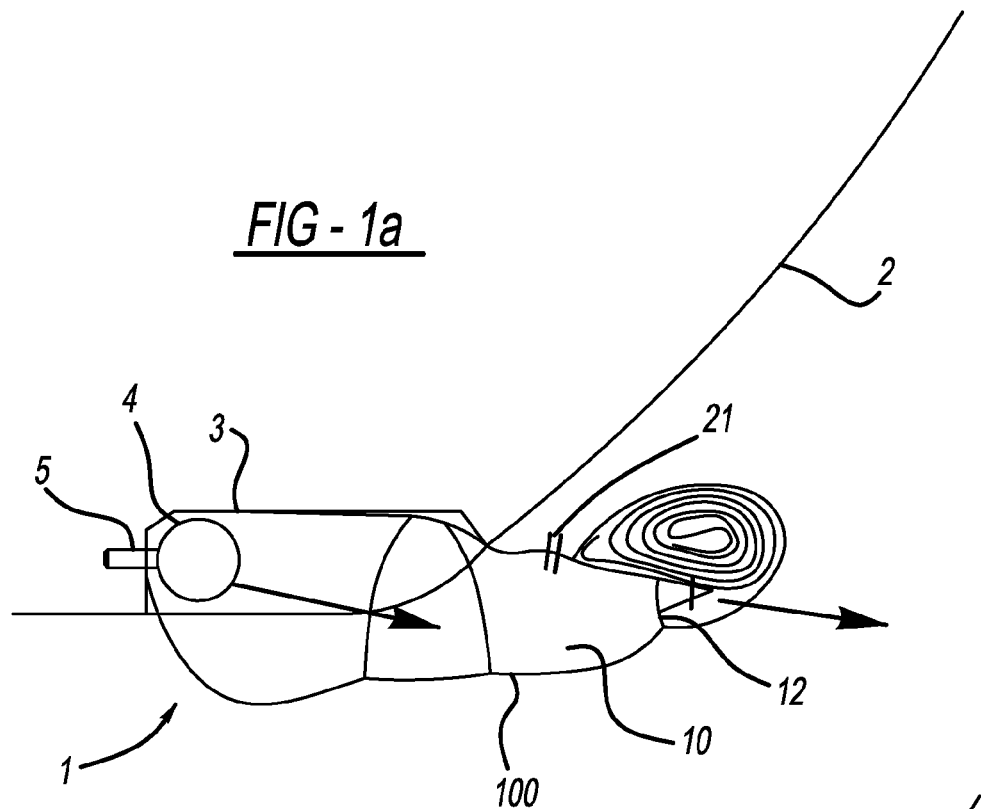
FIGS. 1a to 1f show the inflation behaviour of a knee airbag according to the invention.

FIGS. 1a to 1f show a protection device 1 with a knee airbag 100 in various phases of being filled with inflating gas. The protection device 1 is arranged in a vehicle structure 2, for example an instrument panel of a motor vehicle. A module housing 3 in which a gas generator 4 is fixed via fastening bolts 5 is formed or arranged in the vehicle structure 2. The knee airbag 100 is also accommodated within the module housing 3 and concealed in a collapsed state behind a covering (not shown). In the rest position, the knee airbag 100 is completely collapsed or folded up. After detection of an accident or of an imminent accident, the gas generator 4 is activated and inflating gas is introduced into the knee airbag 100, as indicated by the arrow. FIG. 1a illustrates the ejection of the knee airbag 100 out of the module housing 3. The knee airbag 100 together with the module housing 3 and the gas generator 4 is arranged in the lower region of the vehicle structure 2, i.e. in the foot well of a motor vehicle. By the knee airbag 100 being filled with the inflating gas, the knee airbag 100 is ejected from the module housing 3, wherein the ejection direction takes place substantially horizontally, which is indicated by the right-hand arrows in the figures.

During the further course of filling the knee airbag 100, a base chamber 10 which is closest to the gas generator 4 is filled first. A flow obstacle 12 in the form of a catch strap (or tether), a tear seam or a valve device is arranged at that end of the base chamber 10 which faces away from the gas generator 4, thus preventing further flow of the inflating gas into the one or more upper chambers. The upper chambers which cannot yet be seen I FIG. 1a are rolled up and fixed to the base chamber 10 via a fastening seam 21 and a catch strap 22 which will be explained further on.

Figure 1B:
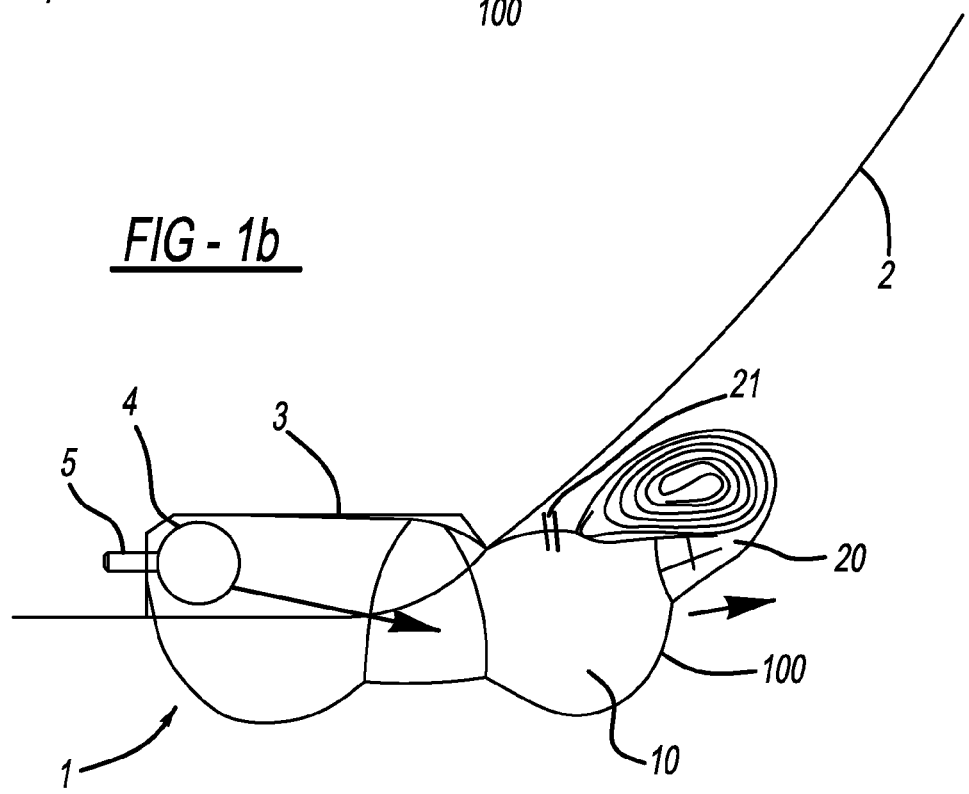

FIG. 1b illustrates the further progress of the filling of the base chamber 10. The substantially horizontal ejection movement is finished and the base chamber 10 continues to be filled with the inflating gas. The upper chamber 20 adjoining the base chamber 10 is not yet or is only slightly filled with inflating gas, and therefore the base chamber 10 is completely filled first with the inflating gas.

Figure 1C:
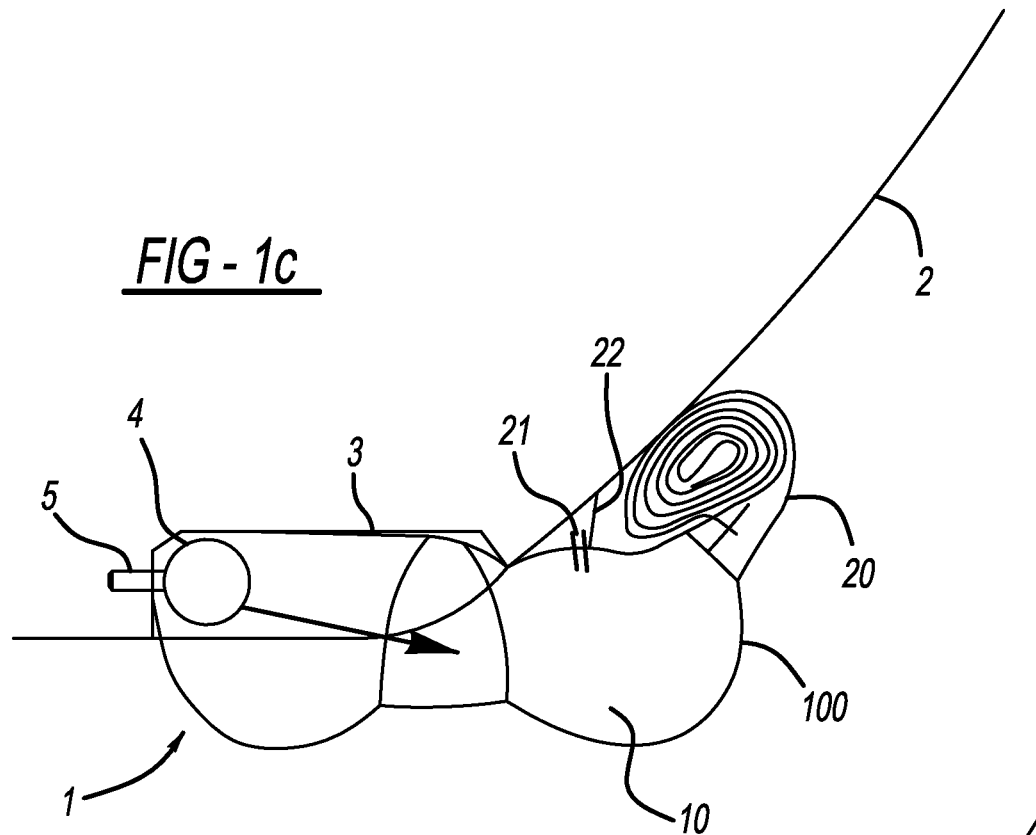

FIG. 1c shows the state in which the base chamber 10 is completely filled and the airbag region adjoining the base chamber 10 is and the upper chamber 20 are moved into the vehicle structure 2. The base chamber 10 is mechanically stable in the meantime and brings about a stable alignment of the undeployed, upper sections of the knee airbag 100. The catch strap 22 which fixes the upper airbag region to the base chamber 10 can be seen in FIG. 1c. It can likewise be seen that the upper chamber 20 is oriented substantially vertically, and the horizontal deployment movement has come to a stop.

Figure 1D:
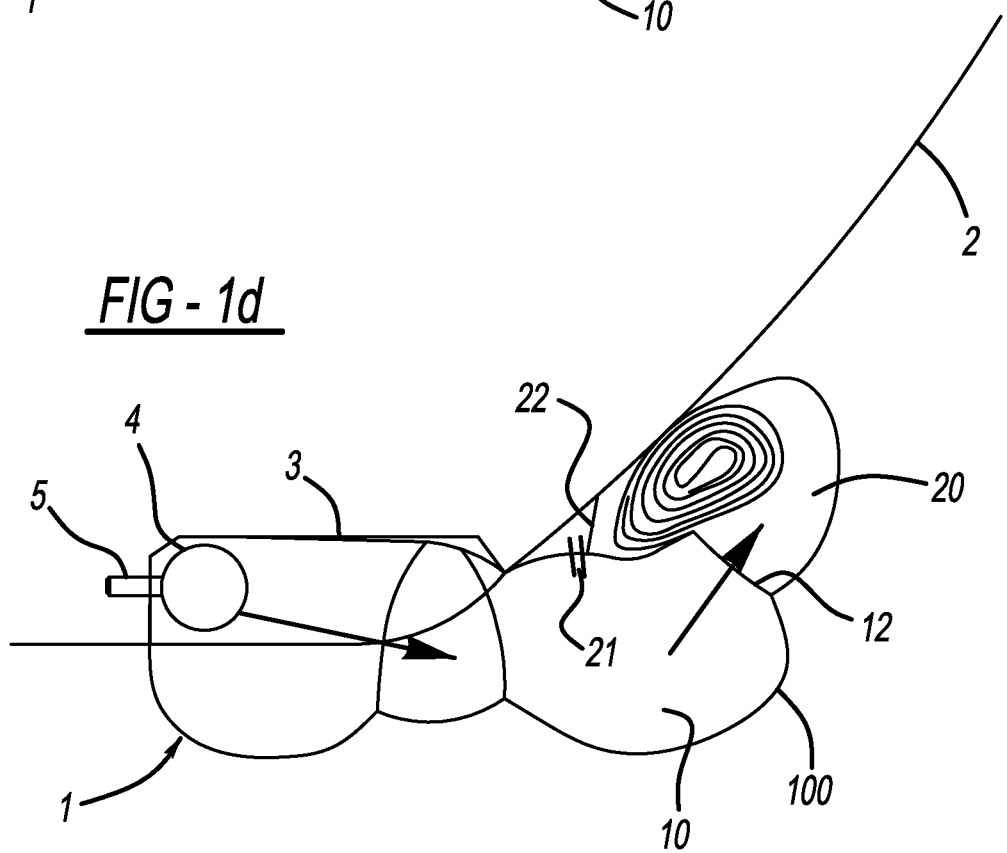

FIG. 1d shows how the flow obstacle 12 between the base chamber 10 and the upper chamber 20 adjoining the base chamber 10 is removed, for example by a tear seam failing, a membrane being destroyed or openings within a catch strap opening. The catch strap 22 continues to be fastened to that side of the base chamber 10 which faces the vehicle structure 2 and prevents an uncontrolled movement of that upper chamber 20 which is just being deployed.

It can be seen in FIG. 1d that the upper chamber 20 is rolled up in the direction of the vehicle structure 2 from the upper end, i.e. the end remote from the gas generator 4, toward the vehicle structure 2. As a result, first of all the outer part, i.e. the part assigned to the vehicle occupant, is inflated, thus giving rise a force component which presses the still collapsed or folded-up part of the upper chamber against the vehicle structure. In this state of deployment, the wedge-like or snail-like configuration of the upper chamber has the effect that, in addition to an increase in volume, that part of the upper chamber 20 which is not yet deployed and filled is pressed against the vehicle structure 2. The catch strap 22 and the tear seam 21 bring about further stabilization and mechanical assignment of an outer fabric section to the inner fabric section of the base chamber 10, which fabric section faces the vehicle structure 2.

Figure 1E:
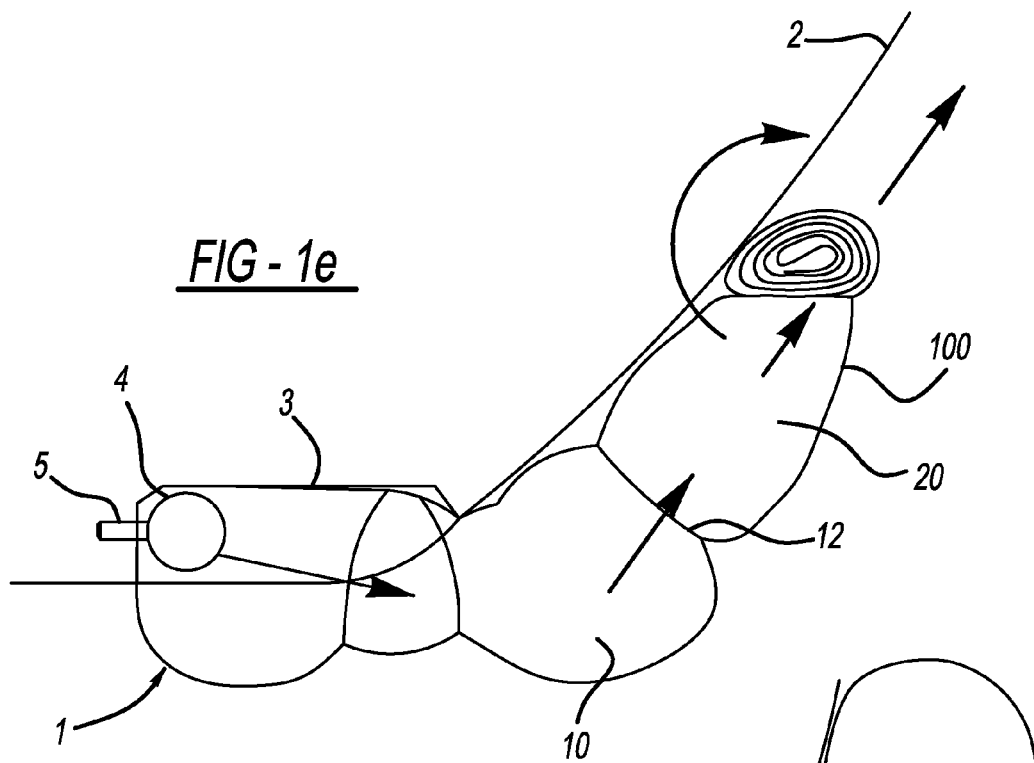

FIG. 1e shows the further filling of the upper chamber 20 after the fixing of the upper chamber via the tear seam 21 and the catch strap 22 has been removed. A virtually vertical knee airbag deployment of the upper chamber 20 takes place, the inflating gas flows unhindered or virtually unhindered through the base chamber 10 and the flow obstacle 12 into the upper chamber 20. The direction of deployment is indicated by the consecutively arranged arrows. The unrolling or deployment of the upper knee airbag regions is likewise indicated by an arrow.

Figure 1F:
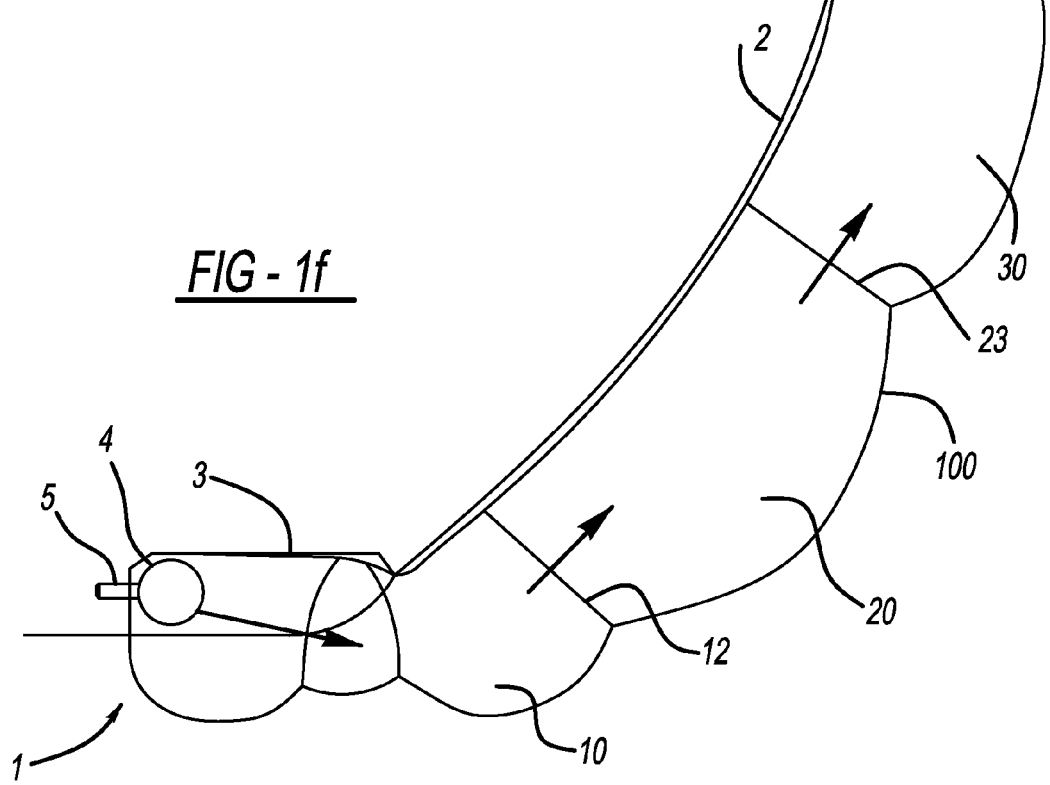

FIG. 1f illustrates a fully filled knee airbag 100 with the base chamber 10, two upper chambers 20 and 30 and flow obstacles 12 and 23 arranged in between. The knee airbag 100 nestles against the curvature of the vehicle structure 2, said contact with the vehicle structure 2 being achieved without that side of the knee airbag 100 which faces the vehicle occupant being supported on the vehicle occupant.

By means of the consecutive filling and deployment of the individual chambers 10, 20, and 30, it is possible for that section of the knee airbag 100 which is initially not yet deployed, i.e. the upper chambers 20 and 30, to be supported on the lower structure of the knee airbag 100, i.e. on the base chamber 10, and for the upper chambers 20 and 30 to be able to be deployed virtually vertically as a result. To bring about the vertical deployment, it is not necessary for the knee airbag 100 to be supported on the lower legs of the vehicle occupants. This is advantageous in particular in deployment situations with occupants who are out of the standard position during the deployment or during the accident. With the proposed solution, it is possible to provide a controlled deployment without additional outer control elements having to be provided. In particular, the airbag does not have to be fixed separately to the vehicle structure, and likewise catch straps do not have to be hooked on the vehicle structure; on the contrary, the controlled deployment is achieved solely by the overflow into the upper knee airbag region, i.e. the region of the upper chambers 20, 30, being temporarily reduced while said regions or upper chambers 20, 30 are simultaneously mechanically fixed. The mechanical fixing can take place either on the previous base chamber 10 or on the upper chambers 20, 30 themselves. The filling of the upper airbag regions with the upper chambers 20, 30 or the mechanical fixing thereof is enabled only after the lower knee airbag region with the base chamber 10 is virtually completely filled. This takes place only at a sufficient internal pressure of the base chamber 10 such that the filling of the subsequent chambers 20 and 30 is initiated and the mechanical fixing of the upper chambers 20 and 30 removed only after reaching a sufficient filling and the sufficient internal pressure of the base chamber 10. The proposed solution can be integrated into previously used knee airbags without changing the blank and can be realized without high costs.

The separating of the regions between the chambers 10, 20 and 30 and the fixing or securing of the rolled-up or collapsed, undeployed airbag regions can be undertaken at the same time or separately. To provide a separation between the chambers 10, 20, and 30, simple tear seams or overflow openings which are variable in cross section can be used in the flow obstacles 12 and 23 designed as catch straps. The collapsed or rolled-up upper chambers 20 and 30 can be fixed to the outer sides, i.e. to the edges of the knee airbag 100 or to an additional tab 22 which serves as a catch strap. An exemplary embodiment of the folding and fixing of the knee airbag 100 is illustrated in FIGS. 2a to 2e.

Figure 2A:
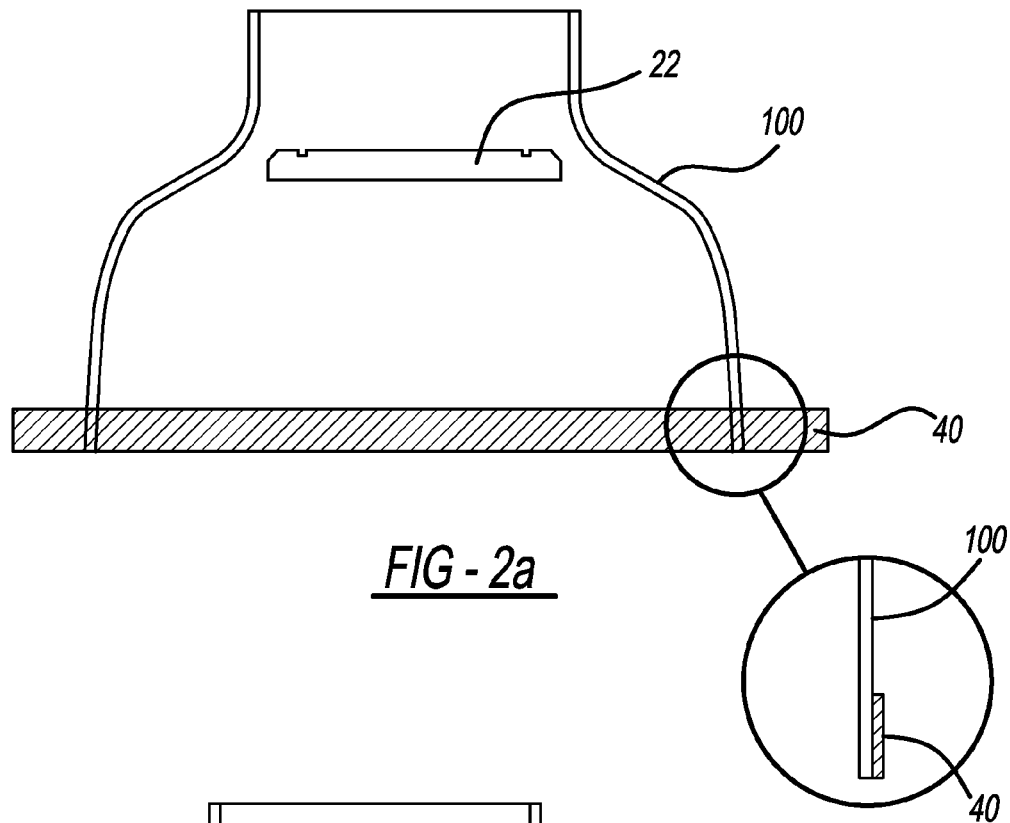

FIG. 2a shows, in a schematic top view, a knee airbag in a state in which it is not filled and is not collapsed. The beginning of the folding, as illustrated in FIG. 2a, takes place with a narrow folding blade 40 which is placed onto the upper side of the knee airbag 100. The airbag material of the knee airbag 100 can be folded repeatedly about the narrow folding blade 40.

Figure 2B:
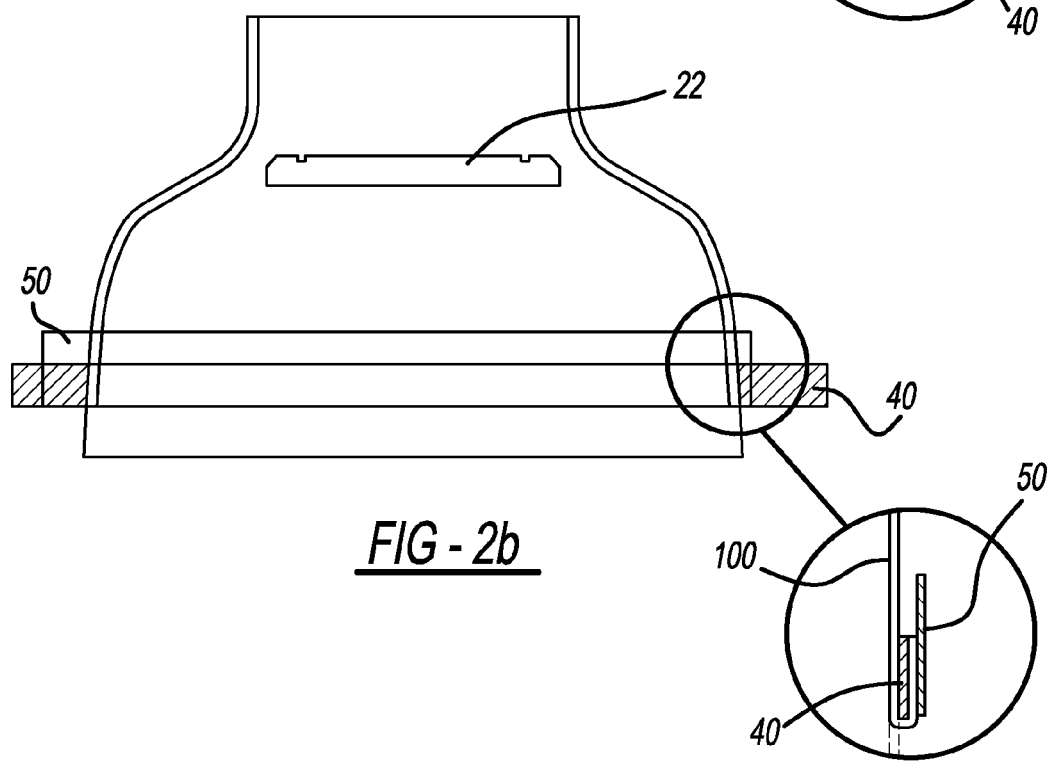

The second, wider folding blade 50, as shown in FIG. 2b, is then placed on. The folding is continued with the wide folding blade 50, as shown in FIG. 2c. Together with the narrow folding blade 40, the knee airbag material is continued from the upper end, i.e. from that end which is furthest away from the insertion opening in the gas generator or from the gas generator.

FIG. 2d illustrates the end of the folding, and the wide folding blade 50 is pulled out. The end of the folding is reached in the exemplary embodiment illustrated when the lower end of the fold comes to lie on a tab which serves as a catch strap 22. After the wide folding blade 50 is pulled out, only one double layer of the airbag material lies above the catch strap 22 and can be connected to the catch strap 22 by a fastenning seam 21. The fastening seam 21 has to be guided only through a few layers of the airbag material in order to fix the rolled-up part of the knee airbag 100, i.e. preferably that part which forms the upper chambers 20 and 30, on the catch strap 22 in the region of the base chamber 10.

Figure 2E:
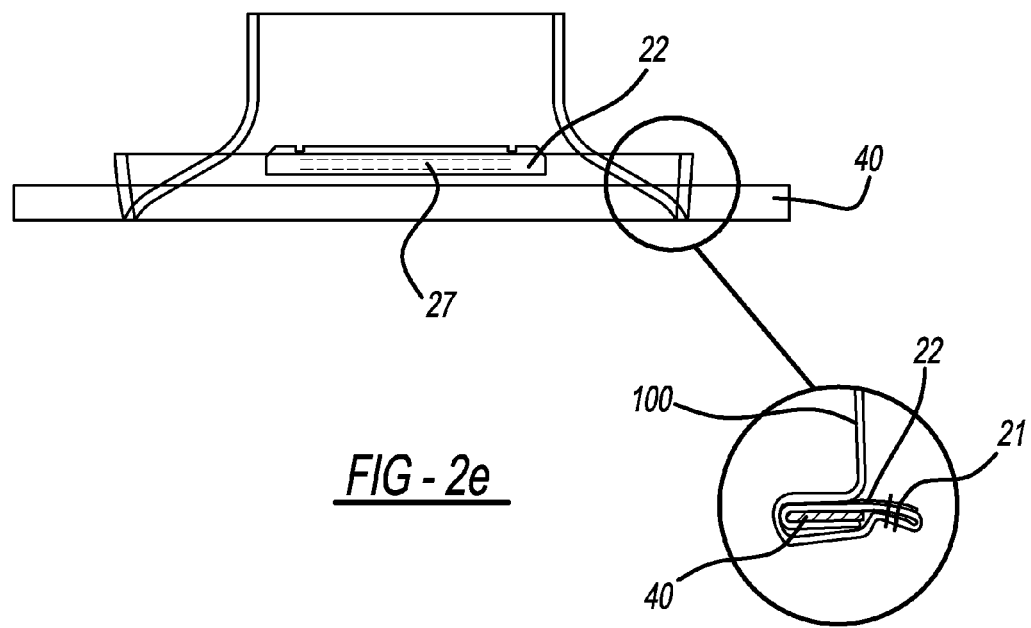

The fixing of the folded airbag section is illustrated in FIG. 2e, still with the folding blade 40 here, which is subsequently pulled out. The flow obstacles are not illustrated in FIGS. 2a to 2e. The flow obstacles may be designed differently, for example by means of a tear seam over the spread airbag, said tear seam being continuous or extending only partially over the cross section. The individual chambers may also be separated via a reduction in the overflow openings in one or more catch straps, wherein the change in cross section takes place as a function of the filling pressure of the previous chambers in the flow direction. The folding makes it possible to provide a folded region which has a reduced number of layers for the positioning of the fixing seam 21 of the prefolded airbag. A reproducible seam through the folded package is therefore possible and can be used to fix the folded package securely to the rest of the airbag material without all of the material layers located one above another having to be sewn through.

Instead of fixing the rolled-up region to a separate catch strap 22, it is also possible for the final folds to be fastened in the edge region 110 of the knee airbag 100. This avoids a seam or fastening in the region of the chambers filled with inflating gas.

With the solution according to the invention, it is possible to position a knee airbag 100 optimally with respect to the occupant and the contour of the vehicle structure 2. An optimum filling of the airbag with inflating gas even upon free dynamic filling without vehicle occupants is ensured by the configuration according to the invention. For this purpose, use is made of measures provided exclusively on the airbag, in particular on the airbag fabric, without an external control element or an application to external structure parts having to be provided. A modification of versions already in existence is possible without a great outlay.

While the above description constitutes the preferred embodiment of the present invention, it will be appreciated that the invention is susceptible to modification, variation and change without departing from the proper scope and fair meaning of the accompanying claims.

The invention claimed is::

1. A knee airbag for protection of vehicle occupants, the knee airbag (100) being deployed between a vehicle occupant and a vehicle structure (2) and used with a gas generator (4) for filling the knee airbag (100) with inflating gas, the knee airbag (100) having a base chamber (10) which is filled first with the inflating gas, and at least one upper chamber (20, 30) which receives the inflating gas conducted through the base chamber (10), and wherein a flow obstacle (12, 23) for the inflating gas is arranged between the base chamber (10) and the at least one upper chamber (20, 30), the upper chamber (20, 30) is rolled-up or collapsed and is secured in the rolled-up or collapsed state by a securing (21, 22) being designed in such a manner that the securing fails when a predetermined degree of filling of the base chamber (10) is reached and thereafter, the at least one upper chamber is inflated by the inflation gas, wherein the base chamber (10) unobstructed by the securing (21, 22) in an initial deployment phase.

2. The knee airbag according to claim 1, wherein the securing (21, 22) is in the form of a tear seam or a catch strap.

3. The knee airbag according to claim 1, wherein the securing (21, 22) fails when the base chamber (10) is completely filled with the inflating gas.

4. The knee airbag according to claim 1, wherein the at least one upper chamber (20, 30) is rolled-up or collapsed in a direction away from the vehicle occupant from an end remote from the gas generator (4).

5. The knee airbag according to claim 1, wherein the flow obstacle (12, 23) is in the form of a tear seam, a catch strap, or a throughflow opening which is enlarged as the gas pressure increases.

6. The knee airbag according to claim 1, wherein the knee airbag (100) has a curved shape in the filled state, the curvature of a side of the knee airbag (100) which faces away from the vehicle occupant corresponding to the curvature of the vehicle structure (2).

7. The knee airbag according to claim 1, wherein the securing (21, 22) takes place on lateral edges (110) of the knee airbag (100).

8. A knee airbag according to claim 1, wherein folds resting on one another in the at least one upper chamber (20, 30) are fixed on one another via a tear seam or on an additional tab (22) on the knee airbag (100).

9. The knee airbag according to claim 1, wherein a region of the upper chamber (20, 30), which region is at a distance from the flow obstacle (12, 23), is fixed mechanically on the base chamber (10).

10. The knee airbag according to claim 1, wherein the knee airbag (100) is collapsed from an end remote from the gas generator (4) in the direction of the gas generator (4) with different folding widths.

11. The knee airbag according to claim 10, wherein the folding width at the end remote from the gas generator (4) is narrower than an end of the fold which faces the gas generator (4).

12. A knee airbag for protection of vehicle occupants, the knee airbag (100) being deployed between a vehicle occupant and a vehicle structure (2) and used with a gas generator (4) for filling the knee airbag (100) with inflating gas, the knee airbag (100) having a base chamber (10) which is filled first with the inflating gas, and at least one upper chamber (20, 30) which receives the inflating gas conducted through the base chamber (10), and wherein a flow obstacle (12, 23) for the inflating gas is arranged between the base chamber (10) and the at least one upper chamber (20, 30), the upper chamber (20, 30) is rolled-up or collapsed and is secured in the rolled-up or collapsed state by a securing (21, 22) being designed in such a manner that the securing fails when a predetermined degree of filling of the base chamber (10) is reached and thereafter, the at least one upper chamber is inflated by the inflation gas, wherein a plurality of subsequent rolled-up or collapsed upper chambers (20, 30) is provided, and between all adjacent chambers of the upper chambers, a flow obstacle (23) is arranged, each of the upper chambers (20, 30) being secured in the rolled-up or collapsed state by a respective securing, and the respective securing being designed in such a manner that the respective securing fails when a predetermined degree of filling by the inflating gas of the previous upper chamber (20, 30) is reached.

\* \* \* \* \*